H. B. BRISTOL.
LOOSE LEAF BINDER.
APPLICATION FILED NOV. 21, 1910.
985,777.
Patented Mar. 7, 1911.
5 SHEETS—SHEET 3.
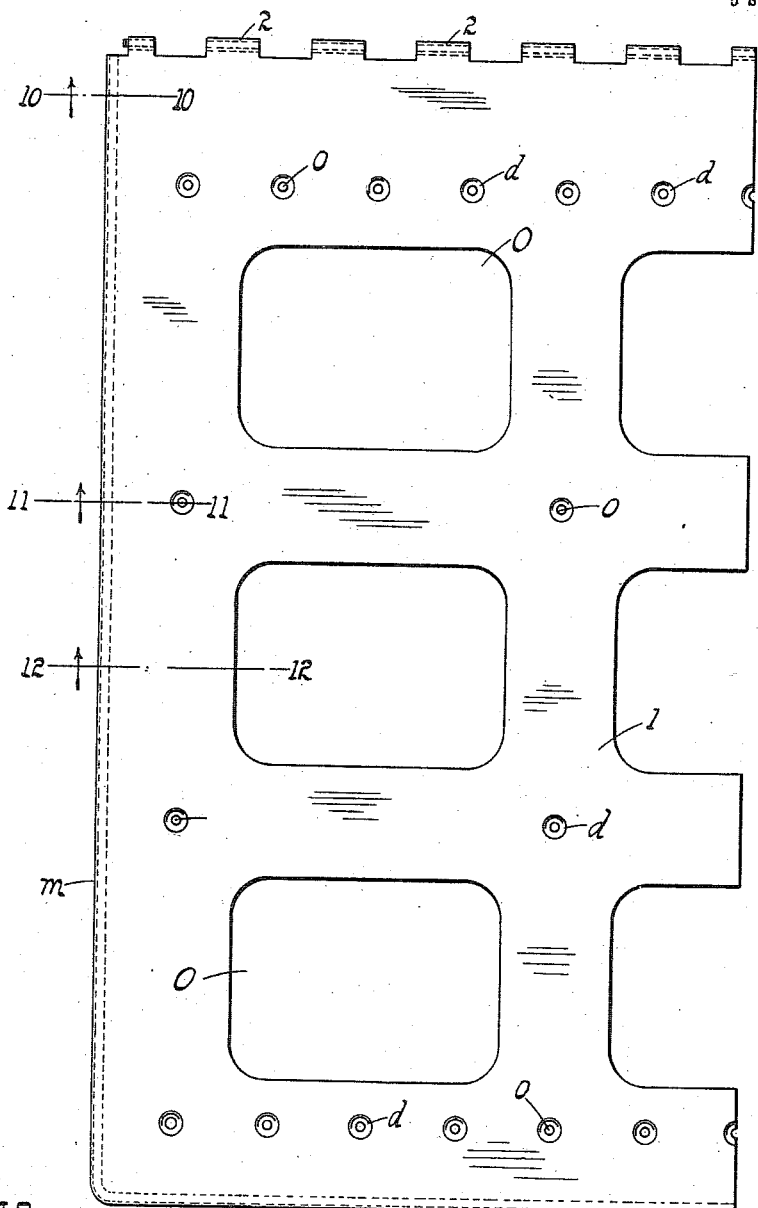
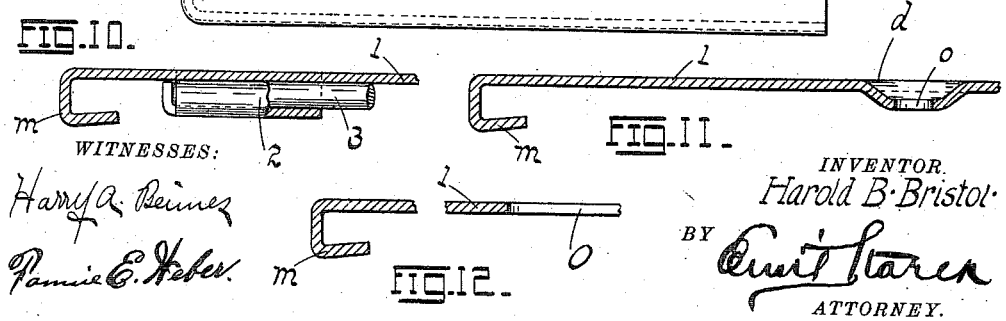
WITNESSES:
Harry A. Beines
Pamie E. Weber
INVENTOR.
Harold B. Bristol.
BY
ATTORNEY.

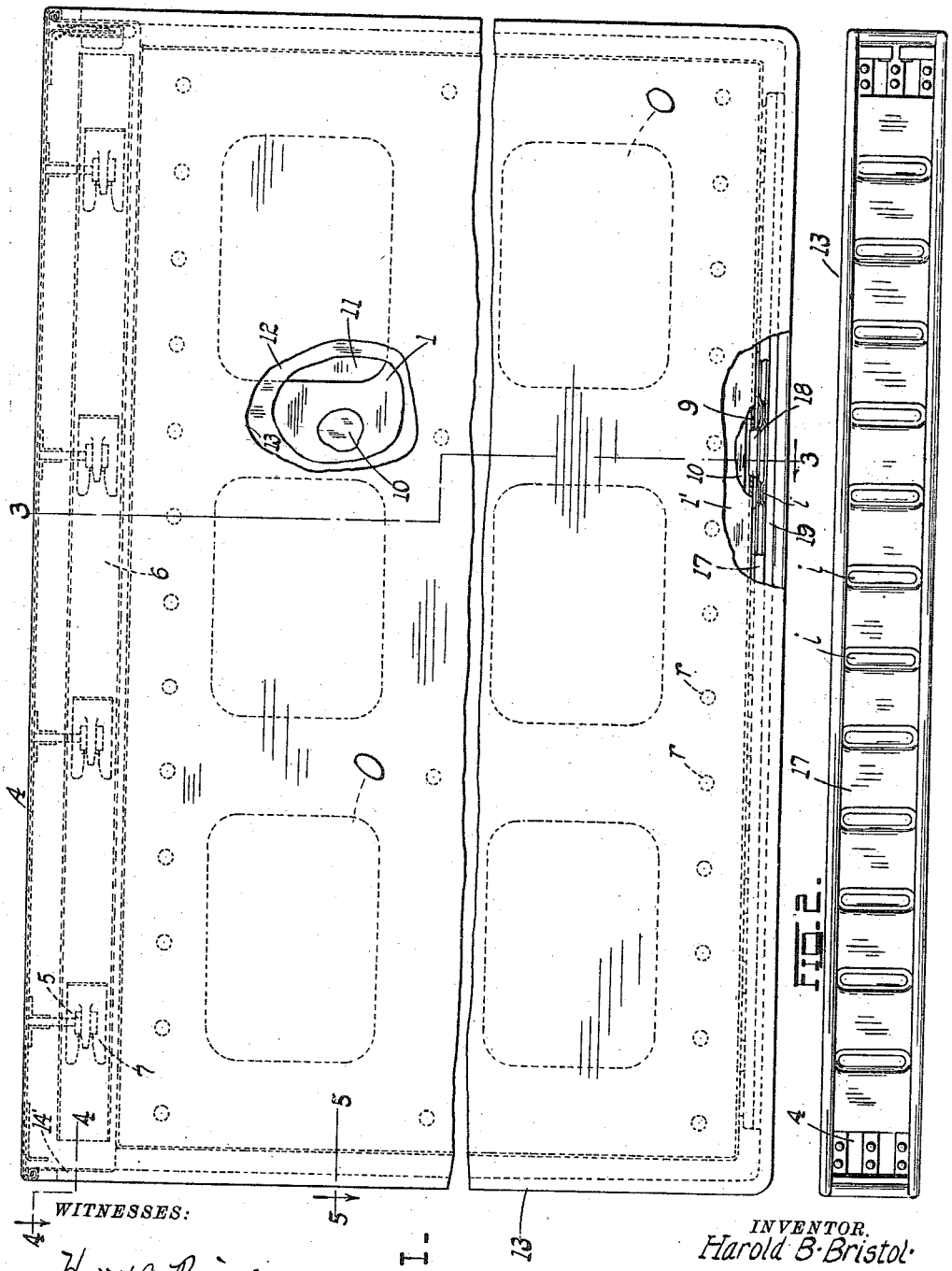

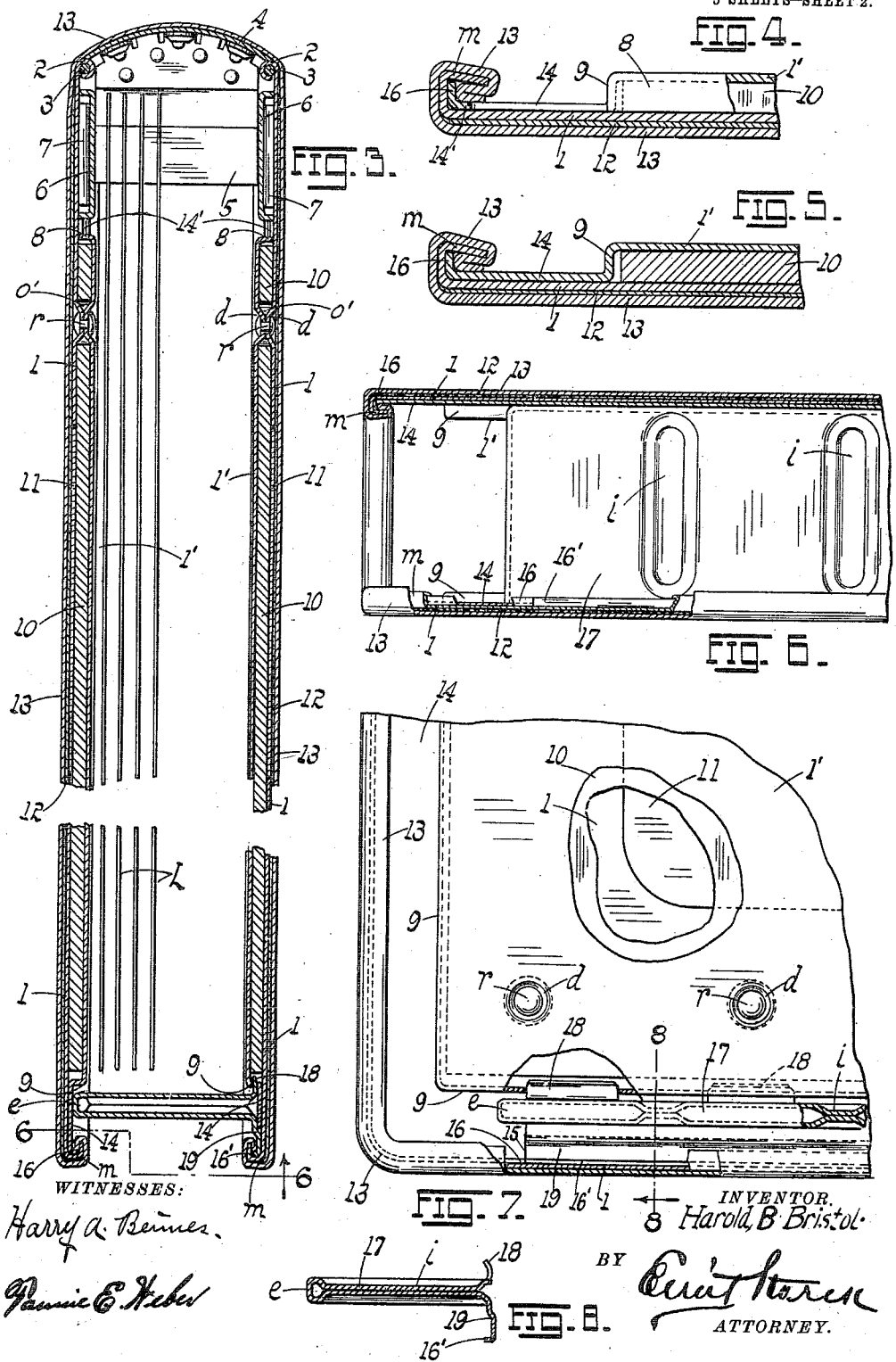

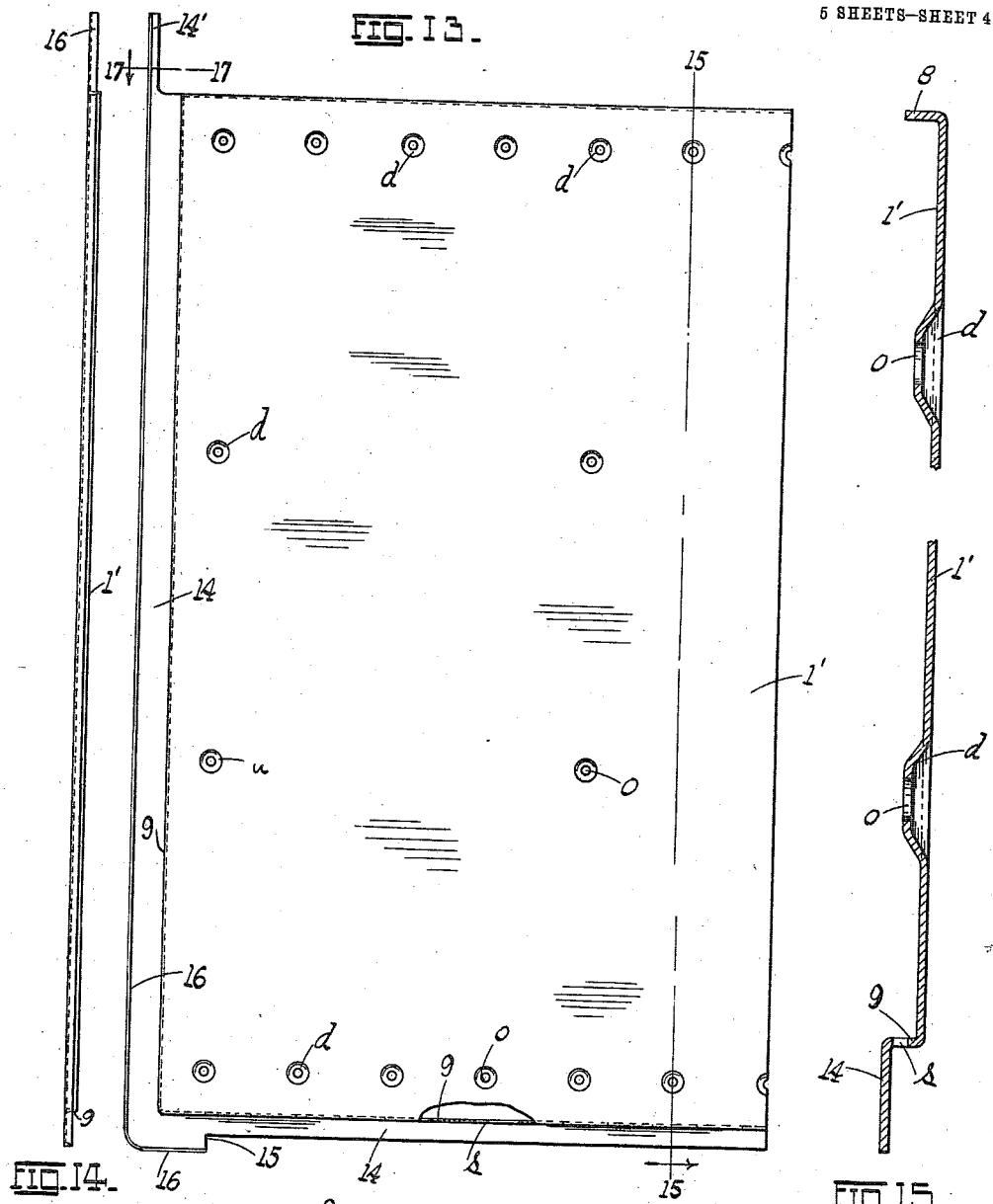

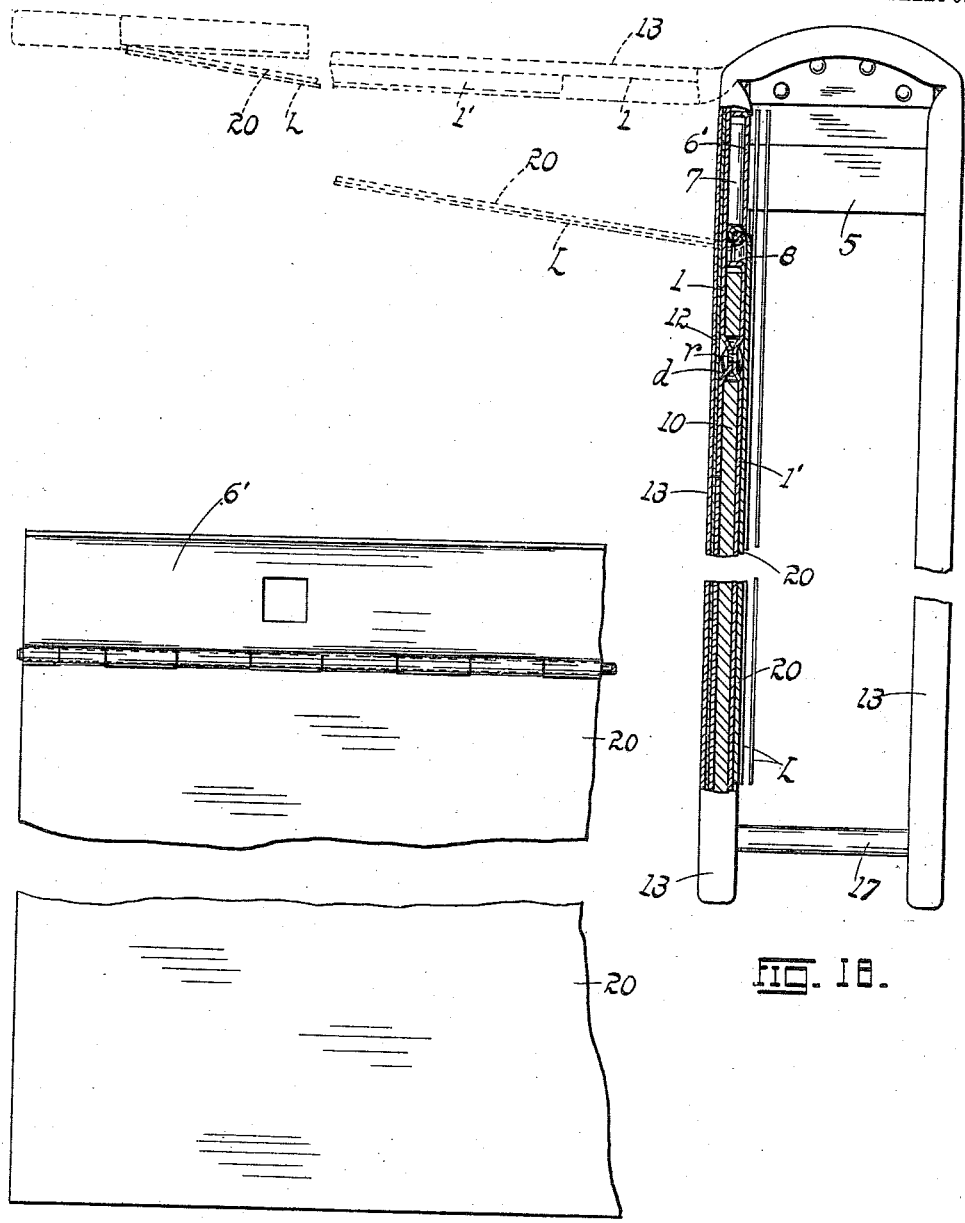

UNITED STATES PATENT OFFICE.

HAROLD B. BRISTOL, OF MAPLEWOOD, MISSOURI.

LOOSE-LEAF BINDER.

985,777.  Specification of Letters Patent.  Patented Mar. 7, 1911.

Application filed November 21, 1910. Serial No. 593,431.

*To all whom it may concern:*

Be it known that I, HAROLD B. BRISTOL, citizen of the United States, residing at Maplewood, in the county of St. Louis and State of Missouri, have invented certain new and useful Improvements in Loose-Leaf Binders, of which the following is a full, clear, and exact description, reference being had to the accompanying drawings, forming a part hereof.

My invention has relation to improvements in loose-leaf binders; and it consists in the novel features of construction more fully set forth in the specification and pointed out in the claims.

In the drawings, Figure 1 is a plan of the binder broken longitudinally, and broken in parts to expose the layers of the cover; Fig. 2 is a front view of the binder in its closed position; Fig. 3 is a cross-section on the line 3—3 of Fig. 1, with a few leaves shown in position; Fig. 4 is an enlarged cross-sectional detail on the line 4—4 of Fig. 1 looking in the direction of the arrow; Fig. 5 is a sectional detail on the line 5—5 of Fig. 1 looking in the direction of the arrow; Fig. 6 is a cross-section on the broken line 6—6 of Fig. 3; Fig. 7 is an enlarged inner face view of one corner of the cover to which the brace or strut by which the covers are held against collapse is anchored, parts being broken away; Fig. 8 is a cross-section of the strut or brace only, on the line 8—8 of Fig. 7; Fig. 9 is a plan of one-half of the outer reinforcing or stiffening plate entering into the construction of the cover; Fig. 10 is a sectional detail on the line 10—10 of Fig. 9; Fig. 11 is a sectional detail on the line 11—11 of Fig. 9; Fig. 12 is a sectional detail on the line 12—12 of Fig. 9; Fig. 13 is a plan of one-half of the inner stiffening plate entering the construction of the cover; Fig. 14 is an edge view of the same; Fig. 15 is an enlarged broken section on the line 15—15 of Fig. 13 looking in the direction of the arrow; Fig. 16 is an end view of a portion of the inner plate (looking upward on Fig. 13); Fig. 17 is a sectional detail on line 17—17 of Fig. 13 looking in the direction of the arrow; Fig. 18 is an end view of the closed book or binder with parts broken, showing the hinged supporting apron for the leaves; and Fig. 19 is a plan of a section of such apron hinged to the leaf-protecting plate which is secured to the ends of the anchors carrying the leaves.

The present invention is an improvement on the construction of binder forming the subject of my pending application for Letters Patent, filed November 11, 1910, Serial Number 591,820; and while contemplating the several objects and possessing the same advantages as enumerated in said pending application, the present improvement is directed to features which afford (1) specific means for preventing the covers of the binder from collapsing upon the withdrawal of the leaves protected by them; (2) means for supporting the leaves over their full area when the covers are swung open; (3) special means for stiffening the covers; and (4) other and further details the advantages of which will be fully apparent from a detailed description of the invention, which is as follows:

Referring to the drawings, and for the present to Figs. 1 to 17 inclusive, 1 represents a metallic plate forming the outer stiffener member for the cover, one of the edges of which is provided with a series of loops 2 stamped and bent integral therewith for the reception of a hinge-pin 3 which connects each cover to the plate 4 forming the back for the book. To the inside of the back 4 are secured a series of leaf anchors 5, carrying the longitudinal leaf-holding and protecting plates 6 locked to the opposite terminals of the anchors by keys 7 or their equivalents, the leaves L being detachable from the anchors as fully explained in my pending application aforesaid.

To the outer metallic stiffener sheet or plate 1 is secured an inner stiffener sheet or plate 1' the latter sheet terminating at a point adjacent the plate 6 (Figs. 1, 3) but otherwise being substantially coextensive with the plate 1. The plates 1, 1', are spaced apart by an inner marginal flange 8 formed in the plate 1', and by the shoulder or offset 9 formed adjacent the three remaining edges of said inner plate 1', the plates being provided with registering conical depressions *d, d*, facing one another and provided with registering openings *o* for the rivets *r* by which the plates are held together. Between the plates 1, 1', is placed a filler of card-board 10 through which are punched holes *o'* for the passage of the rivets *r*, portions of the filler being exposed through windows or openings O formed in the outer plate 1. These openings O are filled with card-board sections 11 cemented to the filler 10, the sections 11 being flush with the outer face of the plate 1. Over the even surface thus formed, and cemented to the sections 11 (the cement not adhering well to the metal 1) is a layer 12 of cardboard, over which is finally laid and cemented an outer layer of leather 13, the latter passing over the back 4.

From the offset or shoulder 9 on the inner plate 1' is bent outwardly a flange 14 resting against the plate 1. At the free edge of the cover the flange 14 of one of the inner plates 1' is cut down or recessed to the depth of the shoulders 15 for a purpose presently to appear. Beyond the shoulders 15 (only one appearing in Fig. 13) the flange 14 has bent therefrom a rim 16. At the inner opposite corners of the plate 1' the flange 14 is extended beyond the flange 8 in the form of extensions 14', the rim 16 forming a part of such extension (Fig. 13), said extensions serving to stiffen the edges of the covers at points between the flanges 8 and the hinge axes of the covers. As was just stated the flange 14 of only one of the inner plates 1' (the right hand one in Fig. 3) has its free edge cut to the depth of the shoulder 15 (Fig. 13), the flange 14 and rim 16 of the inner plate of the opposite cover being left undisturbed. The purpose of this arrangement will appear after concluding the description of the brace or strut member by which the free edges of the covers are maintained against collapse should the bulk of the leaves L be abstracted from the binder. This strut or brace is constructed as follows:—It consists of a sheet of metal (or equivalent material) doubled or bent on itself (Fig. 8) thus forming a double-walled strut or brace 17, the walls being spaced apart at intervals, and at other intervals pressed so as to come into engagement for purposes of stiffening the member as a whole, the pressed portions forming opposed indentations $i$ as shown. The free edge of the inner wall of the strut 17 has stamped therefrom a series of feet 18, an elongated slot $s$ being formed in the shoulder or offset 9 of the inner plate 1' for the reception of each foot. The free edge of the outer wall of said strut member 17 is bent outwardly into a single foot or ribbed supporting flange 19 spanning the flange 14 of the inner plate 1' and resting on the exposed portion of the outer plate 1 beyond said flange, the edge of the foot 19 being turned parallel to the plane of the main folded walls of the strut into a rim 16' which when the parts are assembled registers with the rim 16 turned up from the flange 14 of the inner plate 1' (Figs. 3, 7). The ends of the foot 19 engage the shoulders 15. In first inserting the legs 18 into their slots or sockets $s$, the legs are shoved in their full length or until the strut touches the offset 9 of the inner plate 1' of the cover to which the strut is to be anchored (the opposite cover being temporarily swung open). This allows the foot-piece 19 to be readily passed behind the bend $m$ about which the outer leather layer 13 is folded. Then by shoving the strut toward the bend $m$ or slightly away from the offset 9 of the plate 1' (a position shown in Fig. 3) the foot-piece 19 is brought into proper position inside the bend, after which the bend with its leather layer may be jointly and firmly pressed or clenched over the foot piece, and the strut is thus anchored to the cover intended to carry it. When the opposite cover is closed it rests against the free edge or bead $e$ formed along the fold of the walls of the strut, the two covers being thus permanently maintained in parallelism when the book is closed, preventing not only a collapse of the covers but any strain on the hinges.

If the bound leaves L are sheets of music, they need no special support when the covers of the book or binder are thrown open, since as a rule no occasion arises to write on the surface of such a sheet. If the leaves however, are blank and intended for writing purposes or sheets for recording memoranda, making notes, letter writing or the like, the leaf should have some supporting surface on which it may rest during the writing operation when the book is opened out for that purpose.

Since the leaves swing about the anchor heads 5 as an axis, this axis being removed some distance from the hinge axis of the cover, a considerable gap or space will always exist between the leaves and the cover, thus leaving the leaves unsupported. I accordingly hinge a metallic (or equivalent) leaf or apron 20 to each leaf-protecting plate 6' as shown in Figs. 18 and 19, a hinge joint being provided similar to that formed between the plate 1 and the back 4 of the binder, said apron normally resting against the inner plate 1'. When therefore the covers are thrown open, the aprons 20 and leaves L will oscillate about axes sufficiently close together to allow the leaves to bear with practically their full area upon the apron, whereby the latter will serve as a support for the leaves should a person have occasion to write on the pages of said leaves (dotted position Fig. 18). Without the apron 20 as a support the leaves would collapse with any attempt to write thereon as they easily yield under the pressure of a pencil or pen. Since the shoulders 15 terminate a suitable distance from the ends of the plate 1' it follows that the brace 17 will terminate a suitable distance from the opposite ends of the covers, a full length of brace not being necessary.

Features shown but not described are either well known or have been alluded to in my pending application aforesaid, and hence require no description in the present connection.

Having described my invention, what I claim is:—

1. A loose-leaf binder comprising a back, covers hinged thereto and comprising an outer and an inner plate the latter being spaced apart or offset from the outer plate, said offset on one of the covers being provided with a series of slots disposed parallel to and removed from, the free edge of the cover, a strut or brace provided on one side with a series of feet inserted into said slots, and with a supporting base or foot-piece on the opposite side resting on the cover, the free edge of the outer plate being folded over and clenched over the edge of said foot-piece, the free edge of the strut being adapted to engage the inner face of the opposite cover when the covers are closed, and keep the covers a fixed distance apart.

2. In a loose-leaf binder, a suitable back, a series of leaves carried thereby, covers hinged to the back and comprising each an outer plate, and an inner plate offset therefrom and secured thereto, a filler between the plates, the outer plate being provided with openings, sections of fabric inserted in said openings and cemented to the filler, a layer covering said sections and outer plate and cemented to the sections, and an outer layer of fabric passed over the back and cemented to the layer beneath, substantially as set forth.

3. In a loose-leaf binder, a back, covers hinged thereto and comprising each an outer plate having openings, an inner plate having a flange bent from the plate adjacent to the hinge axis of the cover and bearing with its edge against the outer plate, an offset of substantially the same depth with said flange formed along the remaining three sides of the inner plate, an outer flange bent from said offset parallel to the inner plate and engaging the outer plate, an inner filler between the plates, a longitudinal strut provided with a series of feet bent outwardly from one face thereof, the offset adjacent the free edge of one of the covers being provided with slots for admitting said feet, a foot-piece bent from the opposite face of the strut and resting on the outer plate, the free edge of the latter being folded and clenched about the edge of the foot-piece, the free edge of the strut engaging the inner face of the opposite cover when the binder is closed.

In testimony whereof I affix my signature, in presence of two witnesses.

HAROLD B. BRISTOL.

Witnesses:
 EMIL STAREK,
 FANNIE E. WEBER.

---

Copies of this patent may be obtained for five cents each, by addressing the "Commissioner of Patents, Washington, D. C."